United States Patent
Haas

(10) Patent No.: US 6,827,077 B1
(45) Date of Patent: Dec. 7, 2004

(54) ASSEMBLY FOR COOKING ON A CAMPFIRE

(76) Inventor: Philip E. Haas, N. 14582 County Hwy. M., Thorp, WI (US) 54771

( * ) Notice: Subject to any disclaimer, the term of this patent is extended or adjusted under 35 U.S.C. 154(b) by 0 days.

(21) Appl. No.: 10/681,294

(22) Filed: Oct. 9, 2003

(51) Int. Cl.$^7$ ............................................. A47J 37/07
(52) U.S. Cl. ......................... 126/30; 126/25 A; 126/9 R
(58) Field of Search .............................. 126/9 R, 25 A, 126/30

(56) References Cited

U.S. PATENT DOCUMENTS

| | | | |
|---|---|---|---|
| 1,175,278 A | * 3/1916 | Livermore | 126/30 |
| 2,523,641 A | * 9/1950 | Alvarez | 126/30 |
| 2,827,846 A | 3/1958 | Karkling | |
| 3,261,344 A | * 7/1966 | Petrie | 126/30 |
| 3,791,368 A | 2/1974 | Hunt | |
| 4,328,783 A | * 5/1982 | Martenson | 126/25 R |
| 4,351,312 A | * 9/1982 | Ivy | 126/30 |
| 4,457,290 A | * 7/1984 | Edwards | 126/9 R |
| 4,607,608 A | 8/1986 | Allred et al. | |
| 4,856,423 A | * 8/1989 | Burns | 126/30 |
| 5,287,844 A | * 2/1994 | Fieber | 126/30 |
| 5,495,845 A | * 3/1996 | Hait | 126/9 R |
| 5,666,940 A | * 9/1997 | Kreiter | 126/30 |
| 5,678,531 A | 10/1997 | Byers et al. | |
| 5,758,570 A | * 6/1998 | Hill | 126/9 B |
| 5,848,584 A | * 12/1998 | Brog | 126/30 |
| 6,006,740 A | * 12/1999 | Ulrickson et al. | 126/25 A |
| 6,029,646 A | * 2/2000 | Jackson | 126/30 |
| D427,007 S | 6/2000 | Smitch | |
| 6,070,571 A | * 6/2000 | Bradbury | 126/30 |
| 6,105,569 A | 8/2000 | Andress | |
| 6,386,192 B1 | * 5/2002 | Weber | 126/30 |

* cited by examiner

Primary Examiner—Sara Clarke

(57) ABSTRACT

An assembly for cooking on a campfire includes a vertical support that has an upper end and a pointed lower end. A grill support is attached to the vertical support and is selectively positionable between the upper and lower ends. The support is elongated and has a first end and a second end. A fastener selectively fastens the grill support in a fixed vertical position to the vertical support. A grill is attached to and bounded by an upwardly extending peripheral wall. The peripheral wall has an inner surface and an outer surface. The outer surface is attached to the second end of the grill support. A plate has a peripheral edge and a hinge hingedly couples the peripheral edge to the inner surface of peripheral wall. The plate is selectively positionable between a horizontal position extending over the grill and a vertical orientation extending upwardly away from the grill.

9 Claims, 2 Drawing Sheets

ASSEMBLY FOR COOKING ON A CAMPFIRE

BACKGROUND OF THE INVENTION

1. Field of the Invention

The present invention relates to cooking devices and more particularly pertains to a new cooking device for providing a grill and a griddle combination for preparing food over a campfire.

2. Description of the Prior Art

The use of cooking devices, and particularly those for campfire cooking, is known in the prior art. U.S. Pat. No. 4,607,608 includes a grill or griddle which may be mounted over a campfire and includes a separate attachment for the holding of charcoal briquettes. U.S. Pat. No. 2,827,846 describes a device for mounting a grill and charcoal over a campfire. Yet another type of cooking device that positions a grill over a campfire is U.S. Pat. No. 6,105,569.

While these devices fulfill their respective, particular objectives and requirements, the need remains for a device that combines a grill and a griddle together so that either may be used separately or they may be both used at the same time. Such a device should also have a simple system of switching between the grill and griddle and should include a simple method of adjusting the height between the cooking surfaces and the campfire.

SUMMARY OF THE INVENTION

The present invention meets the needs presented above by generally comprising a vertical support that has an upper end and a lower end that is pointed. A grill support is attached to the vertical support and is selectively positionable between the upper and lower ends. The support is elongated and has a first end and a second end. A fastener is adapted for selectively fastening the grill support in a fixed vertical position with respect to the vertical support. A grill is attached to and bounded by an upwardly extending peripheral wall. The peripheral wall has an inner surface and an outer surface. The outer surface is attached to the second end of the grill support. The grill lies in a substantially horizontal orientated plane when the grill support is mounted on the vertical support. A plate has a peripheral edge and a hinge hingedly couples the peripheral edge to the inner surface of peripheral wall. The plate is selectively positionable between a horizontal position extending over the grill and a vertical orientation extending upwardly away from the grill.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
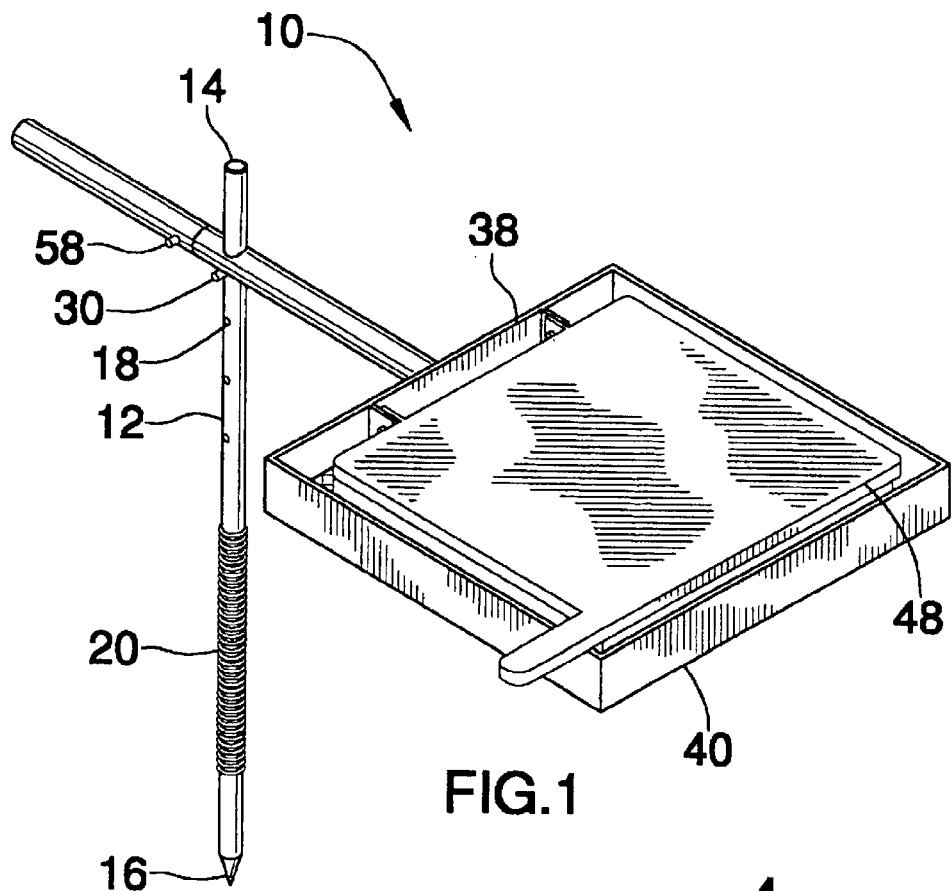
FIG. 1 is a schematic perspective view of a assembly for cooking on a campfire according to the present invention.
Figure 2:
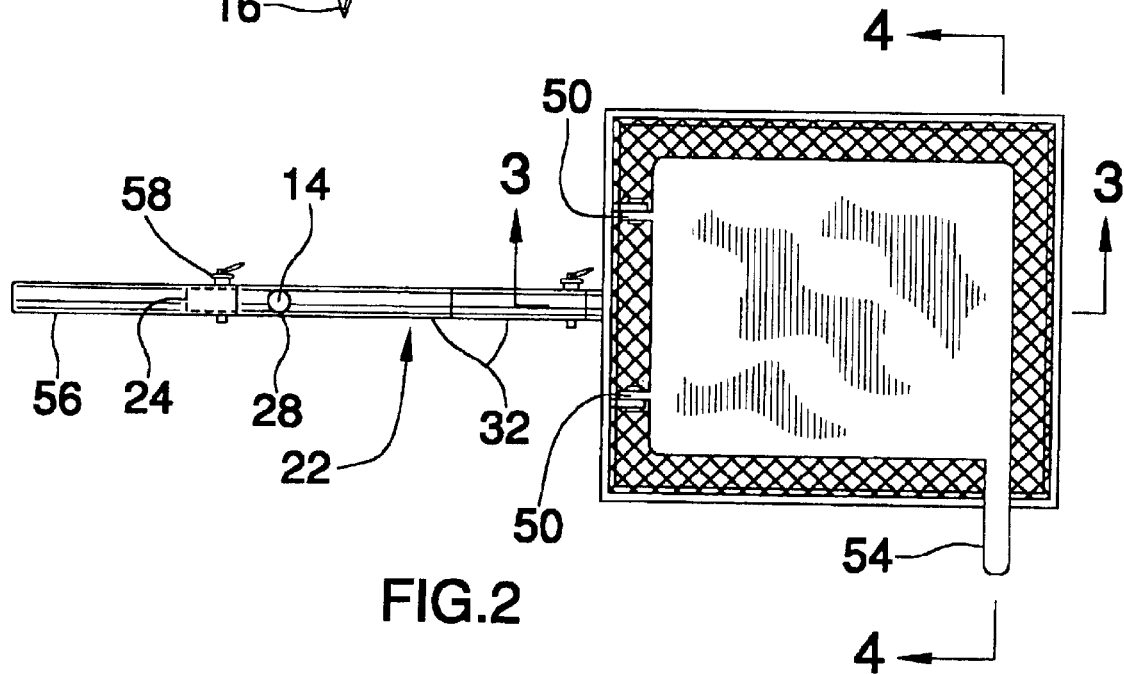
FIG. 2 is a schematic top view of the present invention.
Figure 3:
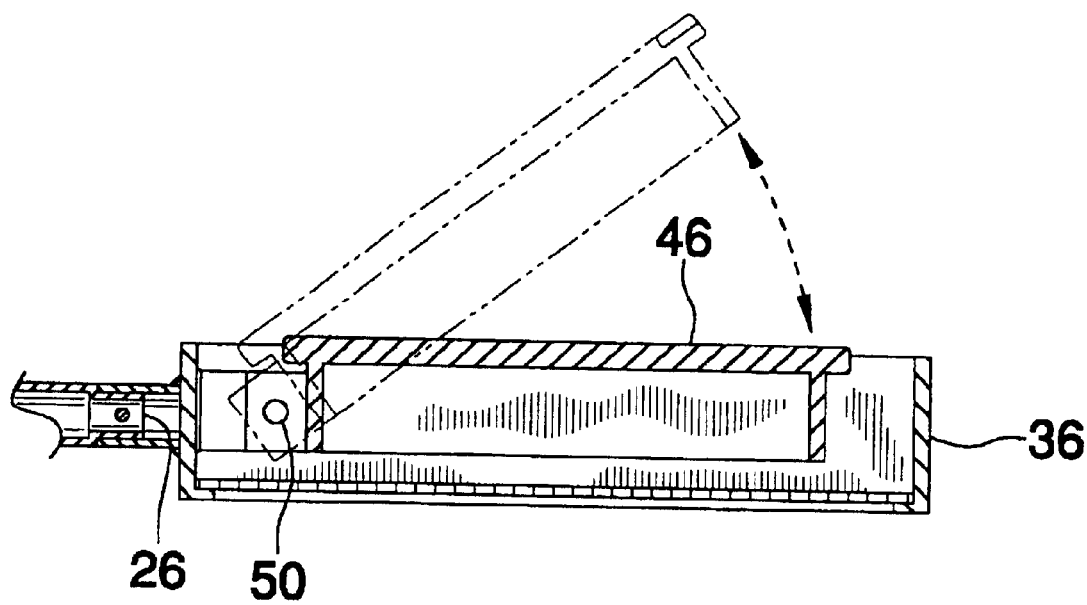
FIG. 3 is a schematic cross-sectional view taken along line 3—3 of FIG. 2 of the present invention.
Figure 4:
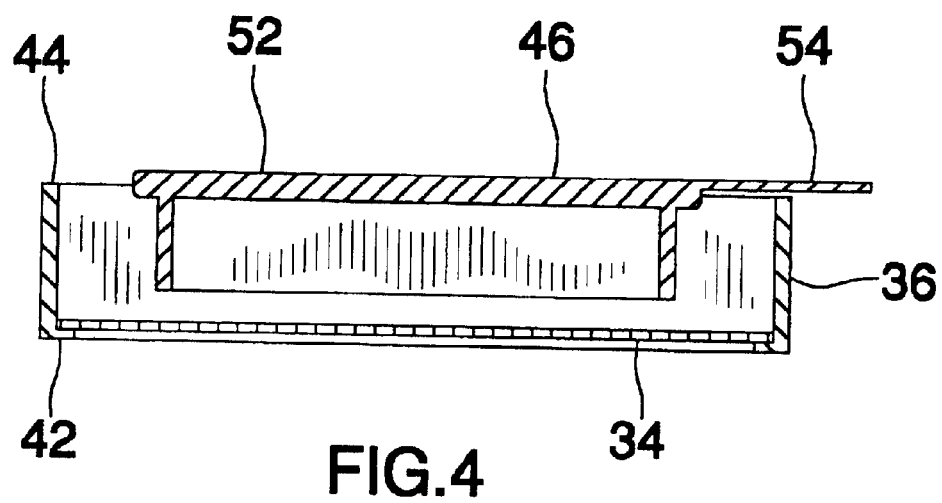
FIG. 4 is a schematic cross-sectional view taken along line 4—4 of FIG. 2 of the present invention.

With reference now to the drawings, and in particular to FIGS. 1 through 4 thereof, a new cooking device embodying the principles and concepts of the present invention and generally designated by the reference numeral 10 will be described.

As best illustrated in FIGS. 1 through 4, the assembly for cooking on a campfire 10 generally comprises a vertical support 12 having an upper end 14 and a lower end 16 wherein the lower end 16 is pointed. The vertical support 12 preferably comprises an elongated rod that has a plurality of apertures IS extending therethrough. The apertures 18 are each orientated generally perpendicular to a longitudinal axis of the rod, or vertical member 12, and are spaced from each other. A lower portion 20 of the rod 18 positioned nearer to the lower end 16 than the upper end 14 preferably has a ribbed outer surface.

A grill support 22 is attached to the vertical support 12 and is selectively positionable between the upper 14 and lower 16 ends. The grill support 22 is elongated and has a first end 24 and a second end 26. The grill support 22 has a bore 28 extending therethrough that is orientated perpendicular to a longitudinal axis of the grill support 22. The rod 12 is extended through the bore 28 so that the grill support 22 may be selectively moved upwardly and downwardly on the rod 12. A fastener 30 adapted for selectively fastening the grill support 22 in a fixed vertical position with respect to the vertical support 12. Preferably, the fastener 30 comprises a pin that is removably extendable through one of the apertures 18. The grill support 22 rests preferably rests upon the pin, or fastener 30, as shown in FIG. 1. Alternatively, the pin 30 may be extended through the grill support 22 and into one of the aperture 18. It is preferred that the grill support includes a plurality of sections 32 which may be selectively unassembled for storage and cleaning purposes.

A grill 34 is attached to and bounded by an upwardly extending peripheral wall 36. The grill 34 may either be a wire mesh material or a plurality of aligned metallic bars. The peripheral wall 36 has an inner surface 38 and an outer surface 40. The outer surface 40 is attached to the second end 26 of the grill support 22. The grill 34 lies in a substantially horizontal orientated plane when the grill support 22 is mounted on the vertical support 12. The grill 34 preferably has a rectangular shape though circular or oval shapes may also be employed. Also, the grill 34, instead of being attached the peripheral wall 36, may be removably positioned on a peripheral flange 42 extending inwardly from the inner surface 38 of the peripheral wall 36.

A plate 46 has a peripheral edge 48 and a hinge 50 hingedly couples the peripheral edge 48 to the inner surface 38 of peripheral wall 36. The plate 46 is selectively positionable between a horizontal position extending over the grill 34 and a vertical orientation extending upwardly away from the grill 34. A top surface 52 of the plate 46 is positioned above an upper edge 44 of the peripheral wall 36 when the plate 46 is in the horizontal position. A handle 54 is attached to the peripheral edge 48 and extends over and outwardly away from the peripheral wall 36. The plate 46 preferably has generally the same shape, but a smaller perimeter, as the grill 34.

A gripping member 56 is removably attached to and extends away from the first end 24 of the grill support 22. Preferably, the gripping member 56 includes a shaft that receives the first end 24 of the grill support 22. A securing member 58 is extended through the gripping member 56 and the grill support 22 for securing the gripping member 56 to the grill support 22. The gripping member 56 may be used for rotating the grill support 22 on the vertical support 12 to position the grill 34 either over or away from a campfire. The gripping member 56 also aids as a counter-weight with respect to the grill 34, plate 46 and peripheral wall 36.

In use, the pointed end 16 of the vertical support 12 is extended into a ground surface adjacent to a campfire. The ribbed surface 20 provides a gripping area while driving the vertical support 12 into the ground surface. The grill support 22 is positioned on the vertical support 12 and its vertical relationship with the campfire determined by the positioning of the fastener 30. The grill 34 is used for cooking food directly over the fire where as the plate 46 is used as a griddle. The plate 46 has a smaller size than the grill 34 so that any food that falls off of the griddle 34 will fall onto the grill 34 instead of into the campfire.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A campfire grill and griddle combination assembly, said assembly including:
   a vertical support having an upper end and a lower end, said lower end being pointed;
   a grill support being attached to said vertical support and being selectively positionable between said upper and lower ends, said support being elongated and having a first end and a second end;
   a fastener being adapted for selectively fastening said grill support in a fixed vertical position with respect to said vertical support;
   a grill being attached to and bounded by an upwardly extending peripheral wall, said peripheral wall having an inner surface and an outer surface, said outer surface being attached to said second end of said grill support, said grill lying in a substantially horizontal orientated plane when said grill support is mounted on said vertical support;
   a plate having a peripheral edge, a hinge hingedly coupling said peripheral edge to said inner surface of peripheral wall, said plate being selectively positionable between a horizontal position extending over said grill and a vertical orientation extending upwardly away from said grill.

2. The assembly of claim 1, wherein said vertical support comprises an elongated rod, said grill support having a bore extending therethrough, said bore being orientated perpendicular to a longitudinal axis of said grill support, said rod being extended through said bore.

3. The assembly of claim 2, wherein said rod has a plurality of apertures extending therethrough and being orientated generally perpendicular to a longitudinal axis of said rod, said apertures being spaced from each other, said fastener comprising a pin being removably extendable through one of said apertures.

4. The assembly of claim 2, a lower portion of said rod positioned nearer to said lower end than said upper end having a ribbed surface.

5. The assembly of claim 1, wherein a top surface of said plate being positioned above an upper edge of said peripheral wall when said plate is in said horizontal position, a handle being attached to said peripheral edge and extending over and outwardly away from said peripheral wall.

6. The assembly of claim 5, wherein said plate has a smaller perimeter than a perimeter of said grill.

7. The assembly of claim 4, further including a gripping member being removably attached to and extending away from said first end of said grill support.

8. The assembly of claim 1, further including a gripping member being removably attached to and extending away from said first end of said grill support.

9. A campfire grill and griddle combination assembly, said assembly including:
   a vertical support having an upper end and a lower end, said lower end being pointed, said vertical support comprising an elongated rod having a plurality of apertures extending therethrough and being orientated generally perpendicular to a longitudinal axis of said rod, said apertures being spaced from each other, a lower portion of said rod positioned nearer to said lower end than said upper end having a ribbed surface;
   a grill support being attached to said vertical support and being selectively positionable between said upper and lower ends, said grill support being elongated and having a first end and a second end, said grill support having a bore extending therethrough, said bore being orientated perpendicular to a longitudinal axis of said grill support, said rod being extended through said bore;
   a fastener being adapted for selectively fastening said grill support in a fixed vertical position with respect to said vertical support, said fastener comprising a pin being removably extendable through one of said apertures;
   a grill being attached to and bounded by an upwardly extending peripheral wall, said peripheral wall having an inner surface and an outer surface, said outer surface being attached to said second end of said grill support, said grill lying in a substantially horizontal orientated plane when said grill support is mounted on said vertical support;
   a plate having a peripheral edge, a hinge hingedly coupling said peripheral edge to said inner surface of peripheral wall, said plate being selectively positionable between a horizontal position extending over said grill and a vertical orientation extending upwardly away from said grill, a top surface of said plate being positioned above an upper edge of said peripheral wall when said plate is in said horizontal position, a handle being attached to said peripheral edge and extending over and outwardly away from said peripheral wall; and
   a gripping member being removably attached to and extending away from said first end of said grill support.

* * * * *